United States Patent [19]
Takahashi

[11] Patent Number: 5,088,356
[45] Date of Patent: Feb. 18, 1992

[54] AUTOMATIC TRANSMISSION HYDRAULIC CONTROL SYSTEM

[75] Inventor: Shigeo Takahashi, Anjo, Japan

[73] Assignee: Aisin Seiki Kabushiki Kaisha, Kariya, Japan

[21] Appl. No.: 590,785

[22] Filed: Oct. 1, 1990

[30] Foreign Application Priority Data

Sep. 30, 1989 [JP] Japan .................................. 1-253750

[51] Int. Cl.⁵ .............................................. B60K 41/14
[52] U.S. Cl. ........................................ 74/868; 74/867; 74/869
[58] Field of Search ...................... 74/867, 868, 869

[56] References Cited

U.S. PATENT DOCUMENTS 4,566,355  1/1986  Sugano ............................. 74/868 X
4,944,201  7/1990  Iino et al. ............................. 74/868

Primary Examiner—Allan D. Herrmann
Assistant Examiner—William O. Trousdell
Attorney, Agent, or Firm—Burns, Doane, Swecker & Mathis

[57] ABSTRACT

An automatic transmission control system includes a shift valve having a valve body, a spool, a sleeve, a plunger and a return spring. An area of the plunger is acted on by a throttle pressure and is smaller than an area of a land acted on by the throttle pressure. Accordingly, the spool is movable against the throttle pressure to make a upshift when the governor pressure is over a predetermined value in relation to the throttle pressure.

5 Claims, 5 Drawing Sheets

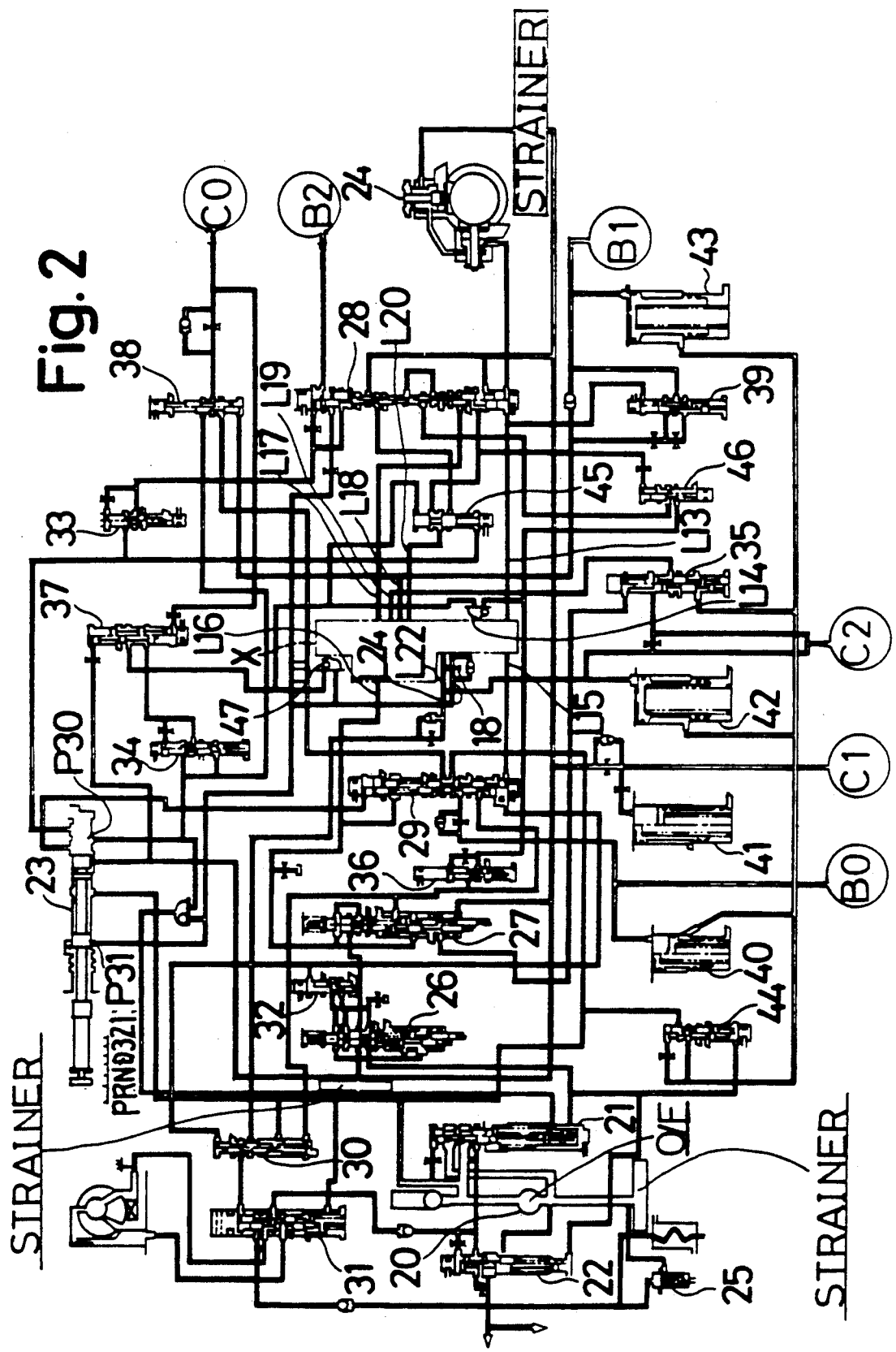

AUTOMATIC TRANSMISSION HYDRAULIC CONTROL SYSTEM

BACKGROUND OF THE INVENTION

1. Field of the Invention

The invention relates to an automatic transmission control system, especially a hydraulic control system in which governor pressure is supplied as an automobile speed signal to a shift valve so as to initiate a shift change of the transmission.

2. Description of the Related Art

An automatic transmission control element is shown in Japanese Patent application 55-36633 and, for example, an overdrive shift valve 1 is shown in FIG. 4. A sleeve 2 is slidable in a valve body, a return spring 3 is disposed between the sleeve 2 and the valve body, a throttle pressure Pth is supplied from an oil passage L1 adjacent a land 4, a governor pressure Pgo is supplied from an oil passage L2 to urge a land 5 against the force of the spring 3 and the throttle pressure Pth. When the pressures satisfy the following formula (1), the shift valve 1 is changed to an upshift position.

$$Pgo \times A1 \geq Pth \times A2 + Fs - Pth \times A3 \quad (1)$$

wherein

A1: area of the spool 5 acted on by the governor pressure Pgo

Fs: force of the return spring 3

A2: area of the spool 4 acted on by the throttle pressure Pth

A3 area of the spool 2 acted on by the throttle pressure Pth A upshift changing boundary of the shift valve 1 is fixed as shown in FIG. 7. That is, at the area $\Theta_2 \sim 0$ corresponding to the degree of the throttle opening, A2=A3 and Pgo×A1=Fs=-const. Therefore, automobile speed at the changing point is V2 (equal to a constant, shown as line o in FIG. 7) irrespective of the changing of the throttle pressure Pth. At the area over $\Theta_2$, if Pth×A3 is equal to FS at the point M, the formula (1) shows Pgo×A1≧Pth×A2 and a shift of the transmission occurs. In this area, the spool 2 is urged by the throttle pressure Pth to an upper position and make governor pressure Pgo is equal to mrw²/Ago, therefore, the changing boundary shows a secondary curve B corresponding to automobile speed.

In a known 2-3 shift valve shown in FIG. 8, a 1→2 shift point is fixed and the characteristics of the throttle pressure Pth and governor pressure Pgo are determined in order to select a performance driving mode or a fuel economy mode. The characteristics or modes are shown as in FIGS. 5 and 6. When the 2→3 shift point is fixed in the same way, only Fs, A1, A2 in FIG. 8 are fixed, because the throttle pressure Pth and governor pressure Pgo have been determined. Therefore the shift point is inevitably decided as shown in full line in FIG. 9. That is, the 2→3 shift point crosses the 1-2 shift point at the area of a reduced degree of throttle opening. In FIG. 9, the 2→3 shift point is moved to the right by the changing of the ratio of A1 to A2 of the 2→3 shift valve and Fs. However, the shift point shown with a dotted line which has a point of inflection at V2 is not obtained, because the characteristics of the throttle pressure Pth and the governor pressure Pgo have been determined by the full lines shown in FIGS. 5 and 6.

The determination of the shift point of the automatic transmission has to correspond with the operating characteristic of the engine or the dimensions of the automobile. In the shift valve 1 in FIG. 4, however, the shift point is constant at the automobile speed V2 in the area below a degree of throttle $\Theta 2$. Therefore, the shift point does not change corresponding to the degree of throttle opening and the automobile speed shown with UP1 or UP2 in FIG. 3 and the performance driving mode or the economy driving mode often is not satisfactory. If the shifting point shown in FIG. 3 is adapted to the shift valve 1 shown in FIG. 4, the throttle valve and the governor valve have a complicated construction in which the pressurized area or the dimensions of the spool or the valve body is changed. In the shift valve shown in FIG. 8, the 1-2 shift point and the 2-3 shift point cross each other as shown in FIG. 9. Accordingly, the shift feel or shift shock worsens or becomes more pronounced. Consequently, if the shift valve shown in FIG. 4 is used as the 2→3 shift valve in order to prevent crossing of the 1→2 changing point and the 2→3 changing point, it is difficult to fix the shift point in accordance with the shift change condition. If the shift valve in FIG. 8 has a changing point at the automobile speed V2 as shown with the dotted line in FIG. 9, the governor pressure characteristic has to be shown the three steps having a point of inflection at the V2.

SUMMARY OF THE INVENTION

It is an object of the invention to provide an improved automatic transmission control device which obviates the above conventional drawbacks.

In order to accomplish the object, an automatic transmission control device is provided with a shift valve having a valve body, a spool inserted into the valve body and having a land acted on by throttle pressure, a sleeve inserted into the valve body at one end of the spool, a plunger inserted into the sleeve to contact the end of the spool, a return spring disposed between the plunger and the sleeve and acted on by the throttle pressure through the plunger and by a governor pressure through the spool and the plunger. An area of the plunger acted on by the throttle pressure is smaller than an area of the land acted on by the throttle pressure. The spool moves against the throttle pressure to make a upshift when the governor pressure is over a predetermined value in relation to the throttle pressure.

BRIEF DESCRIPTION OF THE DRAWINGS

FIG. 2 shows an oil pressure control circuit of the invention.

DETAILED DESCRIPTION OF THE INVENTION

Figure 1:
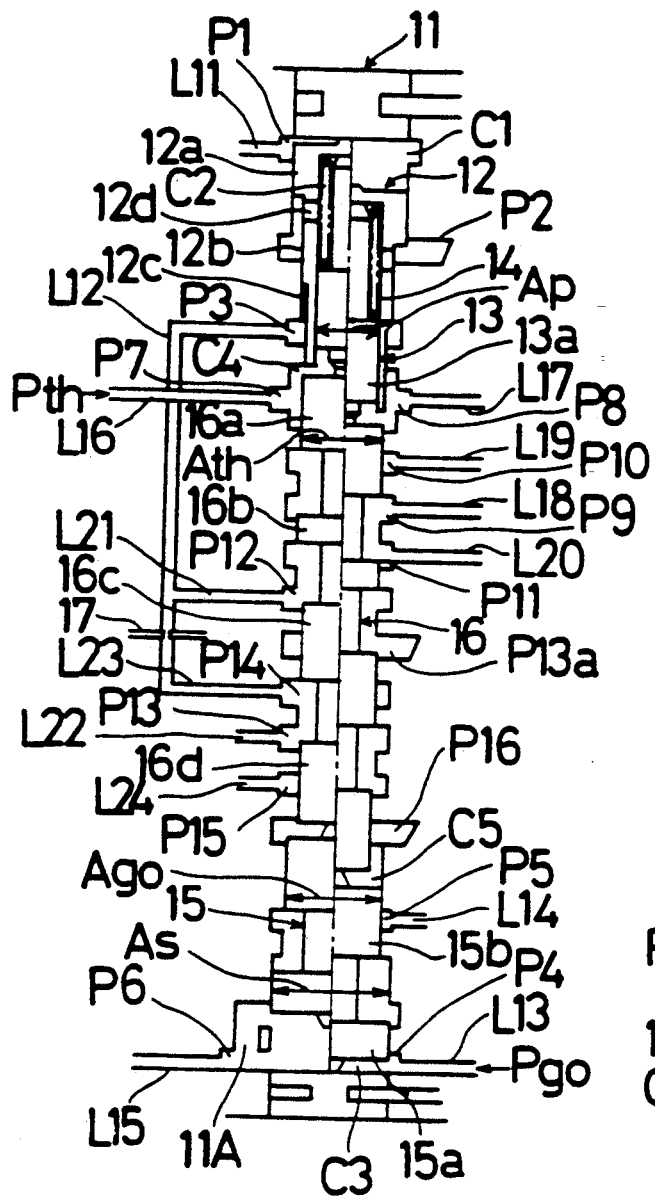
FIG. 1 shows a cross sectional view of a shift valve of the invention.

A 2→3 shift valve 11 shown in FIG. 1 is disposed in the position identified at X in FIG. 2. In the upper part of the valve body of the 2→3 shift valve 11, a sleeve 12 open at its lower end is slidably disposed. A port P1 supplying the oil pressure from a passage L11 to a chamber C1 located between the upper face of the sleeve 12 and an end face of the valve body. A plunger 13 having a land 13a is slidably disposed in the sleeve 12 and a return spring 14 is disposed between the plunger and the sleeve so as to urge the plunger away from the chamber C1. The sleeve 12 is provided with step portions along the outer diameter, namely a large diameter step 12a, a middle diameter step 12b and a small diameter step 12c descending in diameter from chamber C1. A passage 12d is formed in the middle diameter step 12b to communicate a drain port P2 formed in the valve body with a chamber C2 defined between the sleeve 12 and the plunger 13. The oil pressure supplied to the port P3 through the passage L12 urges the sleeve 12 in the upper direction as viewed in FIG. 1.

A spool 15 is slidably disposed in the lower part of the valve body. A land 15a is formed on the end of the spool 15 so as to be in contact with the hydraulic fluid provided as governor pressure Pgo supplied from a port P4 and communicated through a passage L13 to the chamber C3. A land 15b is formed on the top end of the spool 15 so as to open the port P5 to the passage L14 when the land is at the upper position (in the left valve position of FIG. 1) and to close it when the land is at the lower position (in the right valve position in FIG. 1). The chamber C3 communicates with the passage L15 through a port P6.

A spool 16 is slidably disposed between the plunger 13 and the spool 15 and has lands 16a, 16b, 16c and 16d. A chamber C4 is formed between the land 13a of the plunger 13 and the land 16a of the spool 16. Throttle pressure Pth communicates through the passage L16 with the port P7. The chamber C4 is also in communication with a passage L17 through a port P8. A port P9 and passage L18 communicates with a port P10 and passage L19 or a port P11 and passage L20 by the movement of the lands 16a, 16b. A port 12 communicates with a passage L21 and with the port P11 or a port P13a by the movement of the lands 16b, 16c. The port 13 and passage L22 is communicated with a port P14 in connection with a passage L23 or a port P15 and passage L24 by movement of the lands 16c, 16d. A chamber C5 formed by the spools 15, 16 is communicative with a drain port P16. The relation of the areas acted on by the pressurized hydraulic fluid is:

$$Ap \leq Ath \leq Ago \leq As$$

wherein
Ap: the area of the plunger 13
Ath: the area of the land 16a
Ago: the area of the land 15b
As: the area of the land 15a In FIG. 2, reference number 20 indicates an oil pump, 21 indicates a primary regulator valve, 22 indicates a secondary regulator valve, 23 indicates a manual valve, 24 indicates a governor valve, 25 indicates a cooler bypass valve, 26 indicates a primary throttle valve, 27 indicates a secondary throttle valve, 28 indicates a 1-2 shift valve, 29 indicates a 3-4 shift valve, 30 indicates a lock-up signal valve, 31 indicates a lock-up relay valve, 32 indicates a cut-back valve, 33 indicates a low coast modulating valve, 34 indicates a second coast modulating valve, 35 indicates a 2-3 shift timing valve, 36 indicates a detent regulator valve, 37 indicates a D-2 timing valve, 38 indicates an overdriving clutch exhaust valve, 39 indicates a 3-2 kick-down orifice control valve, 40, 41, 42 and 43 indicate accumulators, 44 indicates an accumulator control valve, 45 indicates a second lock valve, and 46 indicates a 1-2 relay valve. With the oil pressure circuit, clutches C0, C1 and C2, brakes B0, and B1 and B2, one way clutches F0 and F2 are operated in accordance with the following table so as to engage and disengage the indicated gear ratios.

TABLE 1

| SHIFTING POSITION | | L/U | CL0 | CL1 | CL2 | B0 | B1 | B2 | F0 | F2 | GEAR RATIO |
|---|---|---|---|---|---|---|---|---|---|---|---|
| P | | | ○ | | | | | | ○ | | — |
| R | | | ○ | | ○ | | | ○ | ○ | | 2.655 |
| N | | | ○ | | | | | | ○ | | — |
| D | 4th | ○ | | ○ | ○ | ○ | | | ○ | | 0.717 |
| | 3rd | ○ | ○ | ○ | ○ | | | | ○ | | 1.000 |
| | 2nd | | | ○ | ○ | | | ○ | ⊙ | | 1.567 |
| | 1st | | | ○ | ○ | | | | ○ | ⊙ | 3.075 |
| 3 | 3rd | ○ | ○ | ○ | ○ | | | | ○ | | 1.000 |
| | 2nd | | | ○ | ○ | | | ○ | ⊙ | | 1.567 |
| | 1st | | | ○ | ○ | | | | ○ | ⊙ | 3.075 |
| 2 | 2nd | | | ○ | ○ | | | ○ | ⊙ | | 1.567 |
| | 1st | | | ○ | ○ | | | | ○ | ⊙ | 3.075 |
| L | 1st | | | ○ | ○ | | | | ○ | ○ | 3.075 | wherein ○: engaged
⊙: engaged in driving condition

In the 2-3 shift valve 11, when the throttle pressure Pth is relatively larger than the governor pressure Pgo and the spool is positioned for operation to provide a second gear ratio (in the right valve condition in FIG. 2), the port P11 is in communication with a port P9. Therefore, the line pressure is supplied to the oil pressure cylinder of the brake B1 for second gear operation so that the brake B1 is in an engaged condition. At this time, the port P13 communicates with the port P15 and the passage L24 communicates with a drain port of the manual valve 23 when the manual valve is in the D position. Therefore, the clutch C2 controlling the third and the fourth gear is held in a disengaging condition.

When the governor pressure Pgo is relatively larger than the throttle pressure Pth and the spool 116 is positioned for operation to provide a third gear ratio (in the left valve condition in FIG. 2), the port P11 is in communication with the port P12. Therefore, the line pressure P6 is supplied to the clutch C2 so that the clutch is in an engaged condition. The rate at which the line pressure P6 is supplied to the clutch C2 is controlled by an orifice 17. At this time, the output port P9 communicates with a drain port of the 2-3 timing valve 35 through the port 10 and the passage L19 and the brake B1 for controlling second gear ratio operation is in the disengaged condition. At the R (Reverse) range, the governor pressure Pgo is supplied in the port P4, therefore, the port P15 communicates with the port P13. Consequently, the line pressure P6 of the passage L24 is supplied in the clutch C2 of the R range through the ports P15, P13. The rate of which the line pressure P6 is supplied to the clutch C2 upon shifting to the R range is controlled by an orifice 18.

When the manual valve 23 is set at a drive position other than the second range, the oil pressure in chamber C1 is supplied to the port P1 and the sleeve 12 is urged by the return spring 14 to contact the upper end of the valve body (in the left valve condition in FIG. 1). When the spool 15 is in the lower position (in the right valve condition in FIG. 1) the governor pressure Pgo supplied into the chamber C3 urges the land 15$b$ in the upper direction. Therefore, the 2-3 shift valve 11 initiates an upshift from the second gear to the third gear under the following operating condition:

$$Pgo \times Ago > Pth \times Ath + (Fs - Pth \cdot Ap) \qquad (2)$$

wherein

Fs: an urging force of the return spring 14

Figure 3:
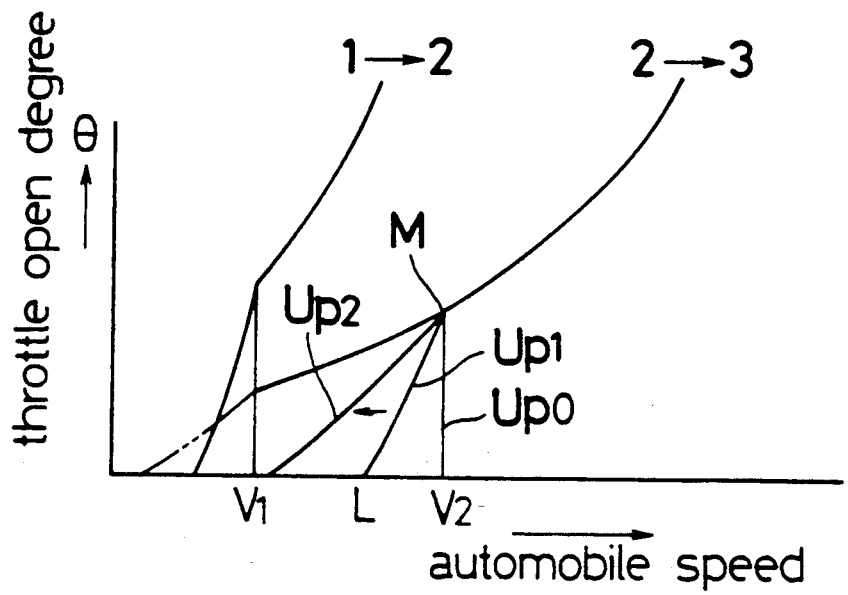
FIG. 3 shows an operational characteristic of the changing boundaries of the invention.
Figure 4:
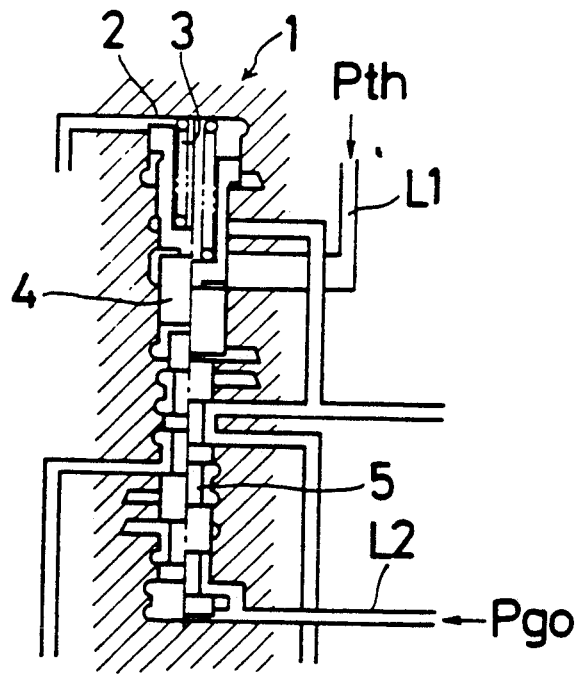
FIG. 4 shows a cross sectional view of a shift valve of the Prior Art.
Figure 5:
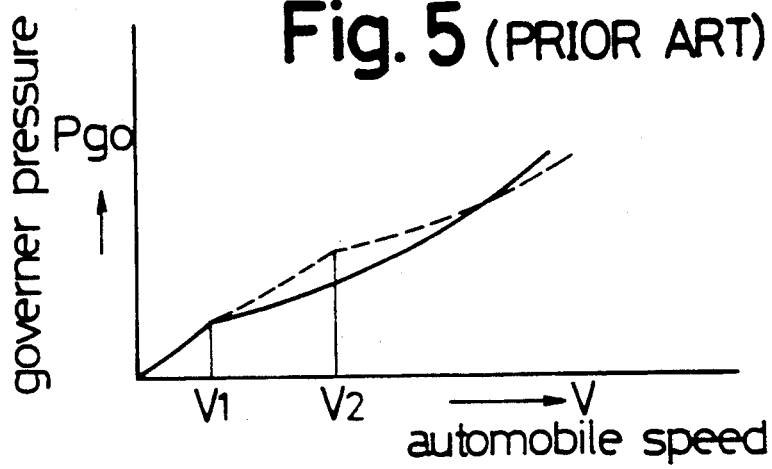
FIG. 5 shows an operational characteristic of a governor pressure of the Prior Art.
Figure 6:
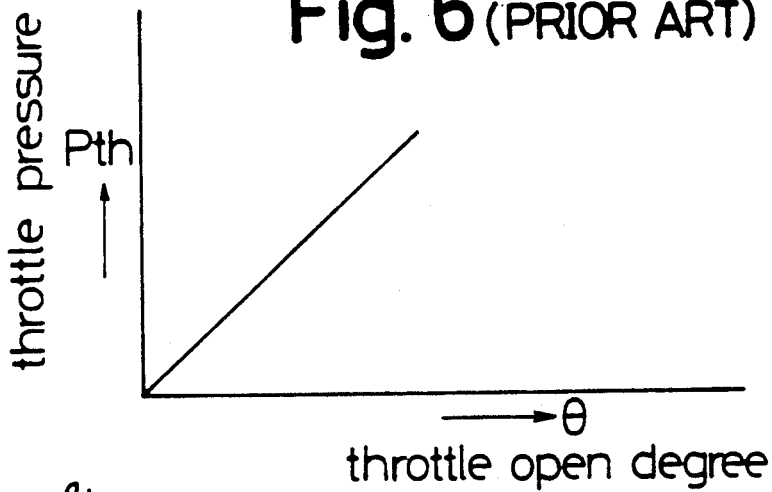
FIG. 6 shows an operational characteristic of a throttle pressure of the Prior Art.
Figure 7:
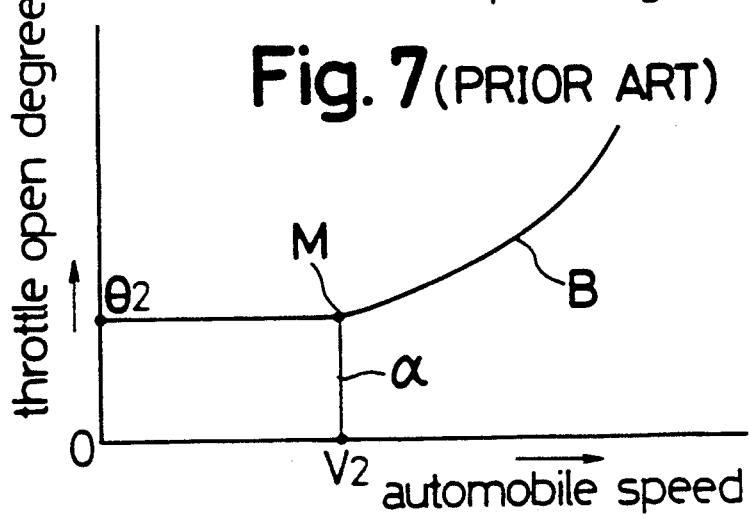
FIG. 7 shows an operational characteristic of the changing boundaries of the shift valve in FIG. 4.
Figure 8:
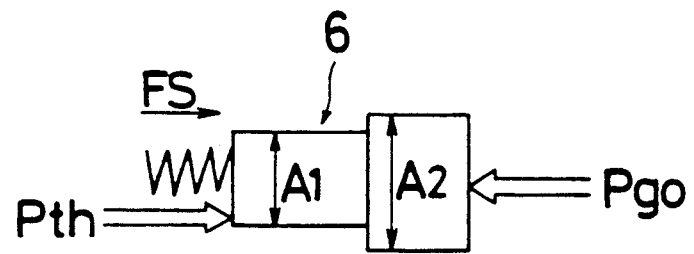
FIG. 8 is a schematic of another embodiment of a shift valve of the Prior Art.
Figure 9:
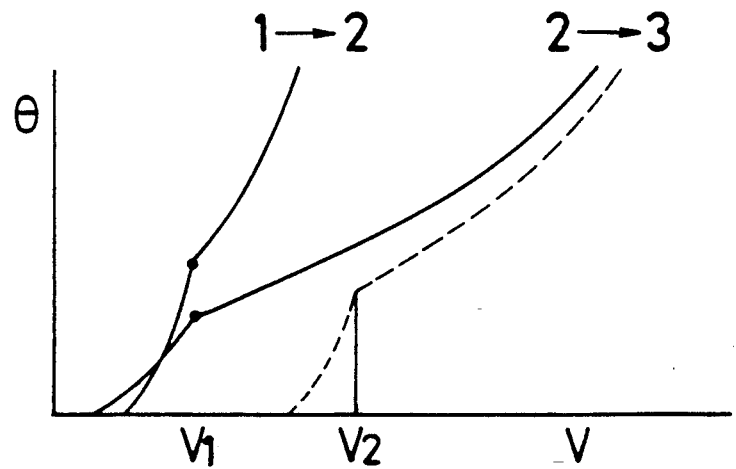
FIG. 9 shows an operational characteristic of the changing boundaries of the shift valve of FIG. 8.

Before the force Pth × Ap which urges the plunger 13 with the throttle pressure Pth is equal to the force Fs of the return spring 14, the 2-3 gear change shift point is changed under the influence of the throttle pressure Pth as shown in FIG. 3 as shown by the line designated UP1. The greater the difference between the pressure of area Ath of the land 16$a$ and the pressure of area Ap of the plunger 13 is, the more the gear change shift point moves in the lower automobile speed as shown in FIG. 3 as shown by the line designated UP2. If the diameter of the plunger 13 or the sleeve 12 is changed, the gear change shift point is easily changed. The changing of the lands 16$a$, 15$b$ is not necessary and the changing of the characteristics of the throttle pressure Pth and the governor pressure Pgo is also unnecessary. In FIG. 3 the gear change shift point L is determined by the force Fs of the spring 14, when the throttle pressure Pth is O. At a point M, the plunger 13 does not further urge the spool 16. The point M being determined by the area Ap of the plunger 13 and the force Fs of the return spring 14. Therefore, the gear change shift point is changed by the changing of the sleeve 12, the plunger 13 and the spring 14.

When the manual valve 23 is set in the second range, the pressure supplied from the port P30 of the manual valve 23 and modulated by the second coast modulating valve 34 is supplied to the port P1 through the D-2 timing valve 37 and the valve 47 so as to act against the sleeve 12. Thereby, the plunger 13, the spools 16, 15 are urged to the lower position (the right valve condition in FIG. 1), the port P14 is closed, the port P13 is communicated with the drain through the port P15, the passage L24 and the port P31, and the clutch C2 is shifted into a disengaged condition. At this time, the line pressure P6 from the port P11 is supplied to the brake B1 through the port P9 and the passage L18. Accordingly, the brake B1 is brought into an engaged condition and the transmission is maintained at second gear. The pressure supplied to the port P1 is determined by the governor pressure Pgo acting on the area As of the spool 15, the line pressure PL supplied from the port P3 to the step of the sleeve 12, and the larger diameter step of the sleeve 12.

If the pressure of the port P1 is supplied to the chamber C2, namely if a passage is formed in the upper end of the sleeve or if the port communicates with the chamber C2 directly, the sleeve 12 is immovable.

Figure 1A:
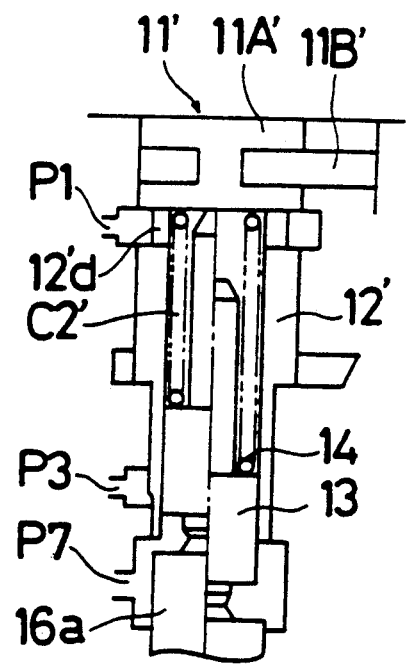
FIG. 1A shows a cross sectional view of another embodiment of a shift valve of the invention.

In the embodiment of FIG. 1A, a sleeve 12' is fixed to the valve body. A reference number 11'A indicates a plug, and 11'B indicates a fixing pin. The operation of the valves of FIGS. 1 and 1A is substantially identical. The structural difference residing in the fixed sleeve 12'.

The foregoing construction of the 2-3 shift valve is applicable to other shift valves.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. An automatic transmission control system comprising:
   a shift valve,
   a valve body,
   a valve spool in said valve body and having a land urged by a throttle pressure in a predetermined direction,
   a sleeve disposed in said valve body at an end of said spool,
   a plunger disposed in said sleeve and in contact with said end of said spool,
   a return spring disposed between said plunger and said sleeve and compressed by said throttle pressure acting on said plunger and by a governor pressure acting on said spool and said plunger, and
   an area of said plunger acted on by said throttle pressure being smaller than an area of said land acted on by said throttle pressure,
   whereby said spool moves against said throttle pressure to upshift said transmission when said governor pressure exceeds a predetermined value in relation to said throttle pressure.

2. An automatic transmission control system according to claim 1, wherein
   pressure from a manual valve is selectively supplied to said shift valve to urge said plunger in said direction.

3. An automatic transmission control device according to claim 2, wherein
   said pressure from said manual valve supplied to said sleeve to urge said plunger in said direction.

4. An automatic transmission control device according to claim 2, wherein said sleeve is movable.

5. An automatic transmission control device according to claim 2, wherein said sleeve is fixed.

* * * * *